US012539898B2

(12) United States Patent
Gaulter

(10) Patent No.: US 12,539,898 B2
(45) Date of Patent: Feb. 3, 2026

(54) OVERHEAD RAIL AND TROLLEY SYSTEM

(71) Applicant: PELLERIN MILNOR CORPORATION, Kenner, LA (US)

(72) Inventor: Ken Gaulter, Destrehan, LA (US)

(73) Assignee: PELLERIN MILNOR CORPORATION, Kenner, LA (US)

(*) Notice: Subject to any disclaimer, the term of this patent is extended or adjusted under 35 U.S.C. 154(b) by 761 days.

(21) Appl. No.: 17/839,036

(22) Filed: Jun. 13, 2022

(65) Prior Publication Data
US 2022/0396294 A1 Dec. 15, 2022

Related U.S. Application Data

(60) Provisional application No. 63/209,847, filed on Jun. 11, 2021.

(51) Int. Cl.
| | | |
|---|---|---|
| *B61H 7/12* | (2006.01) | |
| *B61B 3/00* | (2006.01) | |
| *B61H 9/00* | (2006.01) | |
| *B61H 9/02* | (2006.01) | |
| *B65G 9/00* | (2006.01) | |

(Continued)

(52) U.S. Cl.
CPC .............. *B61H 7/12* (2013.01); *B61B 3/00* (2013.01); *B61H 9/00* (2013.01); *B61H 9/02* (2013.01); *B65G 9/006* (2013.01); *C21D 9/04* (2013.01); *C23C 30/00* (2013.01); *F16D 63/008* (2013.01)

(58) Field of Classification Search
CPC .. B61B 3/00; B61B 13/04; B61H 7/12; B61H 9/00; B61H 9/02; B61H 7/00; B65G 9/006; C21D 9/04; C23C 30/00; F16D 63/008
See application file for complete search history.

(56) References Cited

U.S. PATENT DOCUMENTS

| 1,612,217 A | 12/1926 | Phillips | |
|---|---|---|---|
| 5,564,188 A * | 10/1996 | Akasako | F16C 29/064 29/898.15 |

(Continued)

FOREIGN PATENT DOCUMENTS

| AU | 2018102112 A4 * | 2/2019 |
|---|---|---|
| CN | 111519481 | 8/2020 |

(Continued)

OTHER PUBLICATIONS

PCT International Search Report and Written Opinion of the International Searching Authority, issued on Jan. 12, 2023; PCT/US2022/033254; filed Jun. 13, 2022.

*Primary Examiner* — Cheng Lin
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

The present invention discloses an overhead rail and trolley apparatus and method. The apparatus provides an overhead rail having one or more tracks. A wheeled trolley having a wheel or wheels travels upon the tracks. A stop unit on the rail is positioned to selectively halt the trolley. There is a cutout section on the rail and an insert that is attached to the rail at the cutout. The trolley wheels engage the upper surface of the insert when the trolley is halted by the stop unit. A plating on the insert increases the hardness of the insert upper surface. The insert helps prevent and/or at least lessens wear of apparatus when the trolley is halted by the stop unit.

12 Claims, 21 Drawing Sheets

(51) Int. Cl.
  *C21D 9/04*  (2006.01)
  *C23C 30/00*  (2006.01)
  *F16D 63/00*  (2006.01)

(56) References Cited

U.S. PATENT DOCUMENTS

| | | | | |
|---|---|---|---|---|
| 6,138,574 | A * | 10/2000 | Zaguroli, Jr. | ........... E01B 25/24 |
| | | | | 104/106 |
| 9,849,890 | B2 * | 12/2017 | Quattlebaum | ............ B61B 3/00 |
| 11,059,497 | B2 * | 7/2021 | Kou | ........................ B61B 12/02 |
| 11,408,710 | B2 * | 8/2022 | York | ........................ F41G 1/30 |
| 2017/0275826 | A1 * | 9/2017 | Fenile | ..................... B61B 13/04 |
| 2020/0255036 | A1 * | 8/2020 | Evans | ........................ B61B 3/00 |

FOREIGN PATENT DOCUMENTS

| | | | | |
|---|---|---|---|---|
| DE | 2945792 | | 5/1980 | |
| DE | 8409917 | | 9/1984 | |
| GB | 2581210 | A * | 8/2020 | ............. A63G 21/20 |
| JP | 58-039953 | | 9/1983 | |
| KR | 102101515 | | 4/2020 | |

* cited by examiner

OVERHEAD RAIL AND TROLLEY SYSTEM

CROSS-REFERENCE TO RELATED APPLICATIONS

This application claims benefit of U.S. Provisional Patent Application Ser. No. 63/209,847, filed 11 Jun. 2021, which is hereby incorporated herein by reference.

Priority of U.S. Provisional Patent Application Ser. No. 63/209,847, filed 11 Jun. 2021, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved overhead rail and trolley system having an insert that is hardened and plated and that (in some embodiments) provides steps down or drops in travel direction to prevent chipping that might occur as the trolley wheel passes over an interface of rail and insert.

2. General Background of the Invention

The invention applies to any overhead rail and trolley system used to move a load by suspending the load from a trolley that travels along the rail. Generally, a trolley has wheels that roll on the bottom flange of the rail. Over time, the trolley wheels cause wear to the rail. Unacceptable wear occurs at locations where the uniform motion of the trolley is interrupted by a component such as a mechanical stop.

BRIEF SUMMARY OF THE INVENTION

The present invention provides an apparatus and a method of reinforcing an overhead rail and trolley assembly. The method initially forms a cutout section on the rail that preferably extends above a rail bearing surface or surfaces. The one or more bearing surfaces are provided on the rail to be engaged by and to support a wheel or wheels of a trolley. An insert is preferably heat treated to increase its hardness to a first hardness value (e.g., hardness Rockwell C Scale 48-52). The insert is then preferably coated with a coating that increases its hardness to a second hardness value (e.g., hardness Rockwell C Scale 66-70) greater than the first value. The insert is preferably attached to the rail at the cutout section.

In one or more preferred embodiments, the method step of coating can be plating.

In one or more preferred embodiments, the plating can be chrome plating.

In one or more preferred embodiments, the coating or plating can be Melonite.

In one or more preferred embodiments, there are preferably two bearing surfaces and the trolley has two wheels, and further comprising the step of placing the upper surface of the insert below the bearing surfaces.

In one or more preferred embodiments, there can be a stop assembly supported upon the rail.

In one or more preferred embodiments, the stop assembly can be positioned to stop the trolley at a location where the one or more wheels engage the insert upper surface.

In one or more preferred embodiments, the insert preferably attaches to the rail with a coupler or connector, e.g., a tap strip and multiple fasteners.

In one or more preferred embodiments, the rail preferably has a lower end portion with a longitudinal recess, gap or space and the tap strip preferably occupies the recess, gap or space on first and second end portions of the cutout section.

In one or more preferred embodiments, the insert can be stainless steel (e.g., 410 stainless steel).

In one or more preferred embodiments, the insert can be a metal that has a desired hardness value or that can be hardened to a desired hardness value on the Rockwell C scale, e.g., a hardness value of or between 48-70.

In one or more preferred embodiments, the insert can be formed from a material that has a desired hardness value or that can be hardened to a desired hardness value on the Rockwell C scale, e.g., a hardness value of or between 48-70.

In one or more preferred embodiments, the insert can be formed from a material that can be hardened to create the required substrate for a coating or plating process.

In one or more preferred embodiments, the overhead rail and trolley preferably has an overhead rail having one or more tracks.

In one or more preferred embodiments, a wheeled trolley can have a wheel or wheels that travels upon the tracks.

In one or more preferred embodiments, a stop unit on the rail can be positioned to selectively halt the trolley.

In one or more preferred embodiments, there can be a cutout section on the rail.

In one or more preferred embodiments, an insert can be attached to the rail with a top strip at the cutout.

In one or more preferred embodiments, the trolley wheels preferably engage the upper surface of the insert when the trolley is halted by the stop unit.

In one or more preferred embodiments, a plating can be on the insert that preferably increases the hardness of the insert upper surface.

In one or more preferred embodiments, the insert can be heat treated steel.

In one or more preferred embodiments, the steel can be 410 stainless steel.

In one or more preferred embodiments, the rail can have a lower section that is an inverted U shape.

The present invention preferably provides an insert with a wear surface that is more durable than the rail such as at a high wear area (e.g., location of a stop). The present invention preferably enables easy replacement of the insert, if necessary. The insert can be aligned with the rail, fitting a gap in the rail within a close tolerance. The base material for the insert can be stainless steel (e.g., 410). This material can be hardened to create the required substrate for a coating or plating process.

In one or more preferred embodiments, the thickness of the plating preferably provides uniform hardness characteristics.

In one or more preferred embodiments, the rail can have a web and a lower end portion connected to the web and that preferably includes a longitudinally extending slot having opposed flanges that extend below the web.

In one or more preferred embodiments, further comprising a tap strip preferably attached to the rail and occupying the longitudinally extending slot, wherein the insert can be attached to the tap strip.

In one or more preferred embodiments, the lower end portion of the rail can have one or more shoulders below the web that are preferably below the tap strip.

In one or more preferred embodiments, the lower end portion preferably includes the flanges and one or more shoulders that are below the flanges.

The present invention includes an overhead rail and trolley apparatus, including an overhead rail preferably having one or more tracks, a wheeled trolley preferably having a wheel or wheels that travel upon the tracks, a stop unit on the rail that is preferably positioned to selectively halt the trolley, a cutout section on the rail, an insert that is preferably attached to the rail with a tap strip that can be attached to the rail lower end portion, wherein the trolley wheels engage the upper surface of the insert when the trolley is halted by the stop unit, and a plating on the insert that preferably increases hardness of the insert upper surface.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
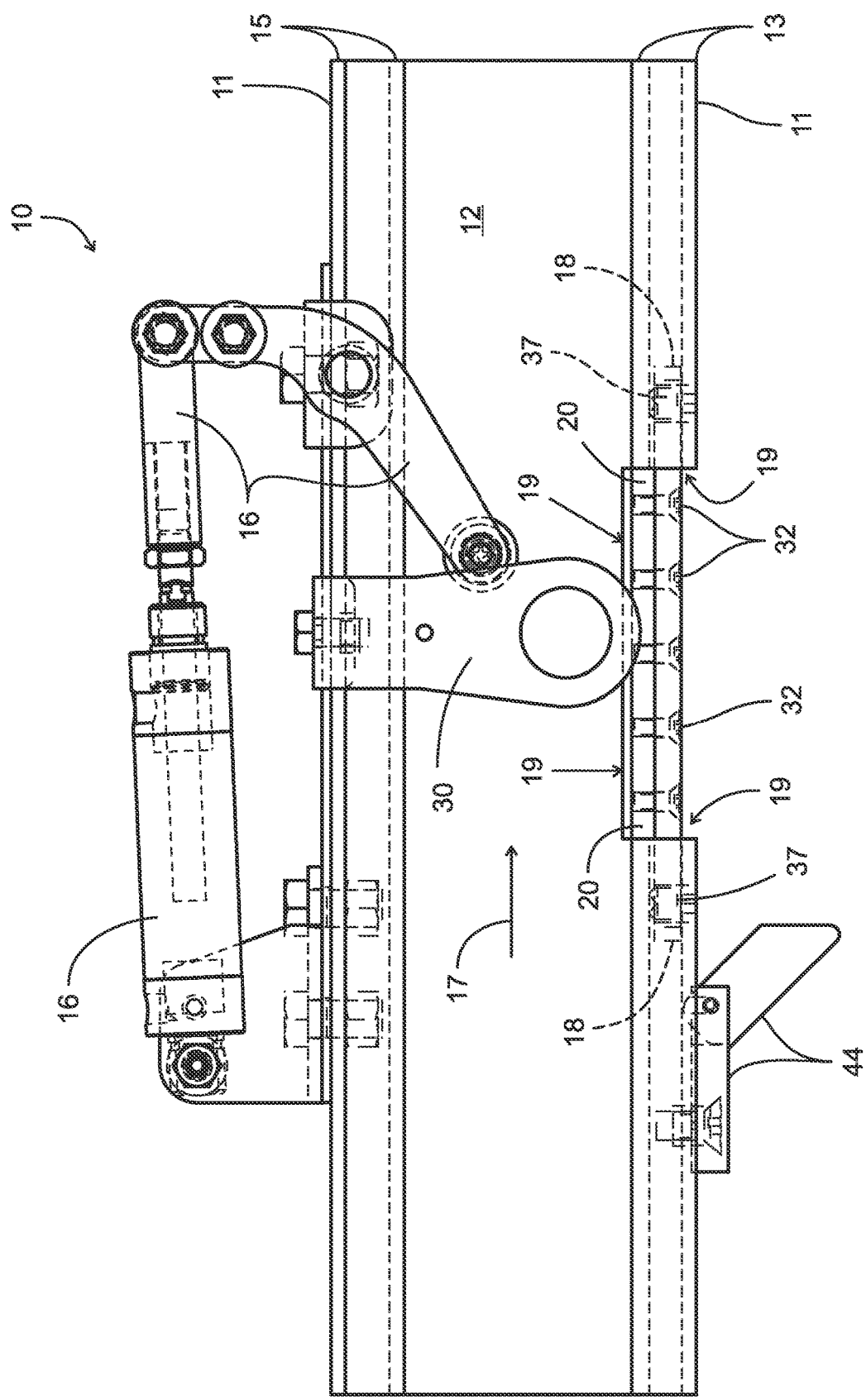
FIG. 1 is an elevation view of a preferred embodiment of the apparatus of the present invention.
Figure 2:
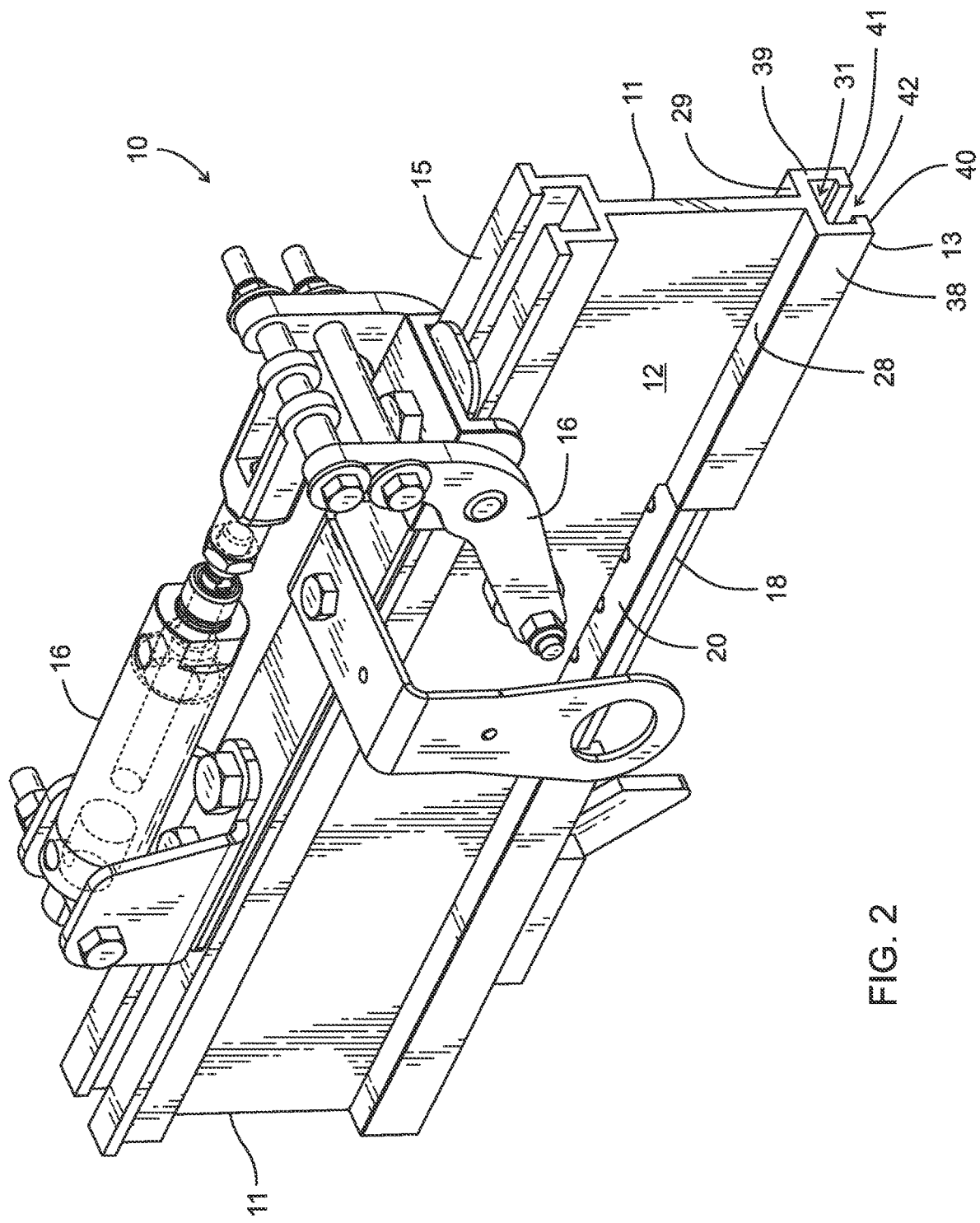
FIG. 2 is a partial perspective view of a preferred embodiment of the apparatus of the present invention.
Figure 3:
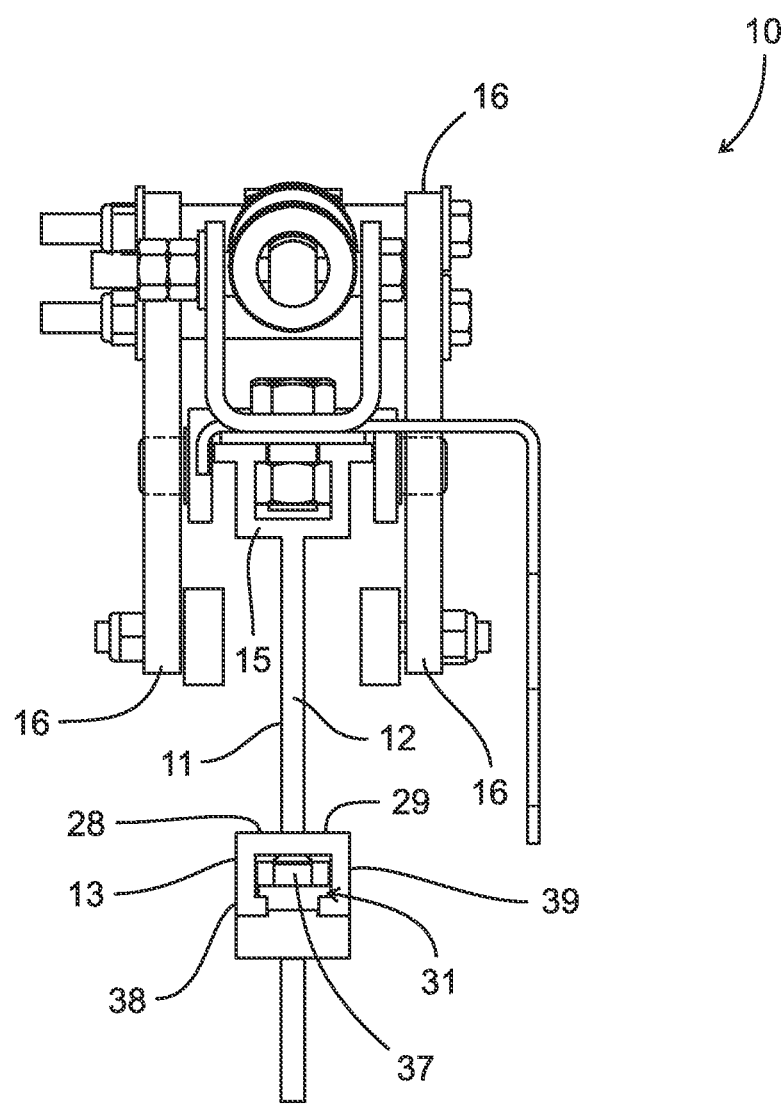
FIG. 3 is a fragmentary end, elevation view of a preferred embodiment of the apparatus of the present invention.

FIGS. 1-23 show a preferred embodiment of the apparatus of the present invention, designated generally by the numeral 10 in FIGS. 1-3. Improved rail and trolley system 10 features an insert 20 that can be fitted to a rail 11 at a gap or cutout section 19 of the rail 11. A trolley 14 can engage the rail 11. At cutout or gap 19, trolley 14 preferably engages insert 20. Trolley 14 preferably engages an upper surface of insert 20 at cutout section or gap 19. Insert 20 preferably has a wear surface that is more durable than the rail 11. The apparatus of the present invention permits easy replacement of insert 20 if necessary.

A base material for insert 20 can be stainless steel (e.g., 410). A plating can be on insert 20 that preferably increases the hardness of insert 20 upper surface 34. Insert 20 can be heat treated to increase its hardness to a first hardness value (e.g., hardness 5 Rockwell C Scale 48-52). Insert 20 can be coated with a coating that increases its hardness to a second hardness value (e.g., hardness Rockwell C Scale 66-70) greater than the first value. Preferably, the plating can be a chrome plating. Preferably, the plating can be Melonite.

Rail 11 can have a web 12 and a lower end portion 13 that is configured to support trolley 14 (see FIGS. 1-3 and 12-14). Rail 11 preferably has an upper end portion 15 that is configured to support a stop assembly 16. Trolley 14 travels in the direction of arrow 17 in FIGS. 1 and 4. Trolley 14 can have flanged wheels or bearings 26, 27 that preferably ride upon rail surfaces 28, 29 at lower end portion 13 of rail 11. A trolley 14 and stop assembly 16 that can be used in one or more preferred embodiments of the present invention can be ones that are both known and commercially available.

Figure 20:
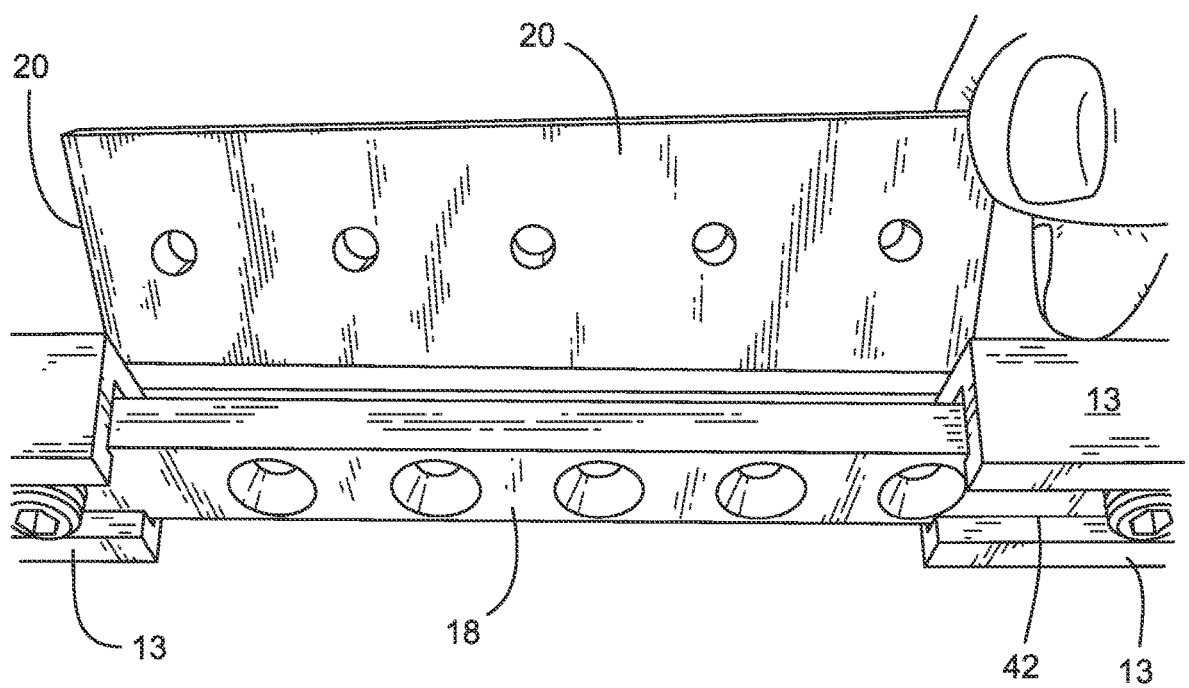
FIG. 20 is a partial perspective view of a preferred embodiment of the apparatus of the present invention showing a rail, a tap strip and an insert.
Figure 21:
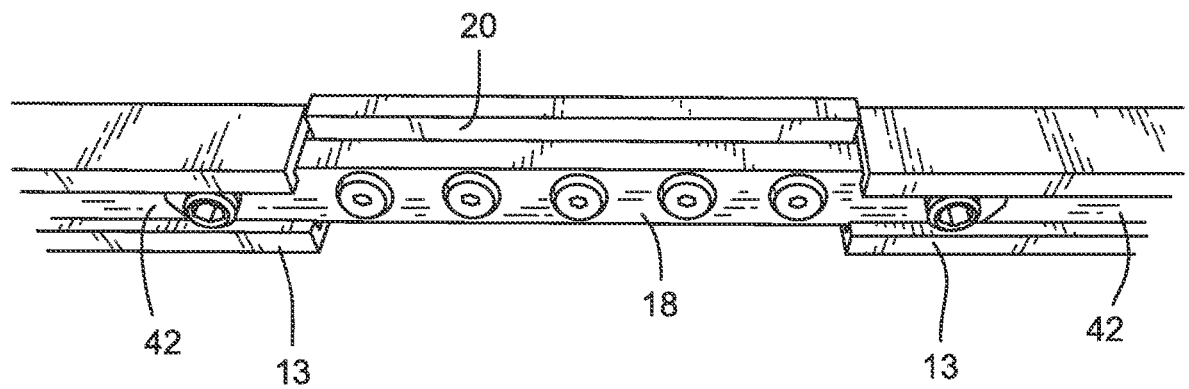
FIG. 21 is a partial perspective view of a preferred embodiment of the apparatus of the present invention showing a rail, a tap strip and an insert.

In FIG. 1, rail 11 preferably has a cutout section or gap 19 that can be positioned below trolley detector 30. At cutout section 19, tap strip 18 preferably occupies a void space 31 in lower end portion 13 of rail 11 below web 12 (see FIGS. 1-4, 12-14, 17-21). Insert 20 is preferably placed on top of tap strip 18 at cutout section 19, as seen in FIGS. 20-21. Fasteners 32 preferably connect insert 20 to tap strip 18.

Each fastener 32 preferably extends through a tap strip opening 33 and threadably engages an internally threaded opening 25 of insert 20.

Figure 5:
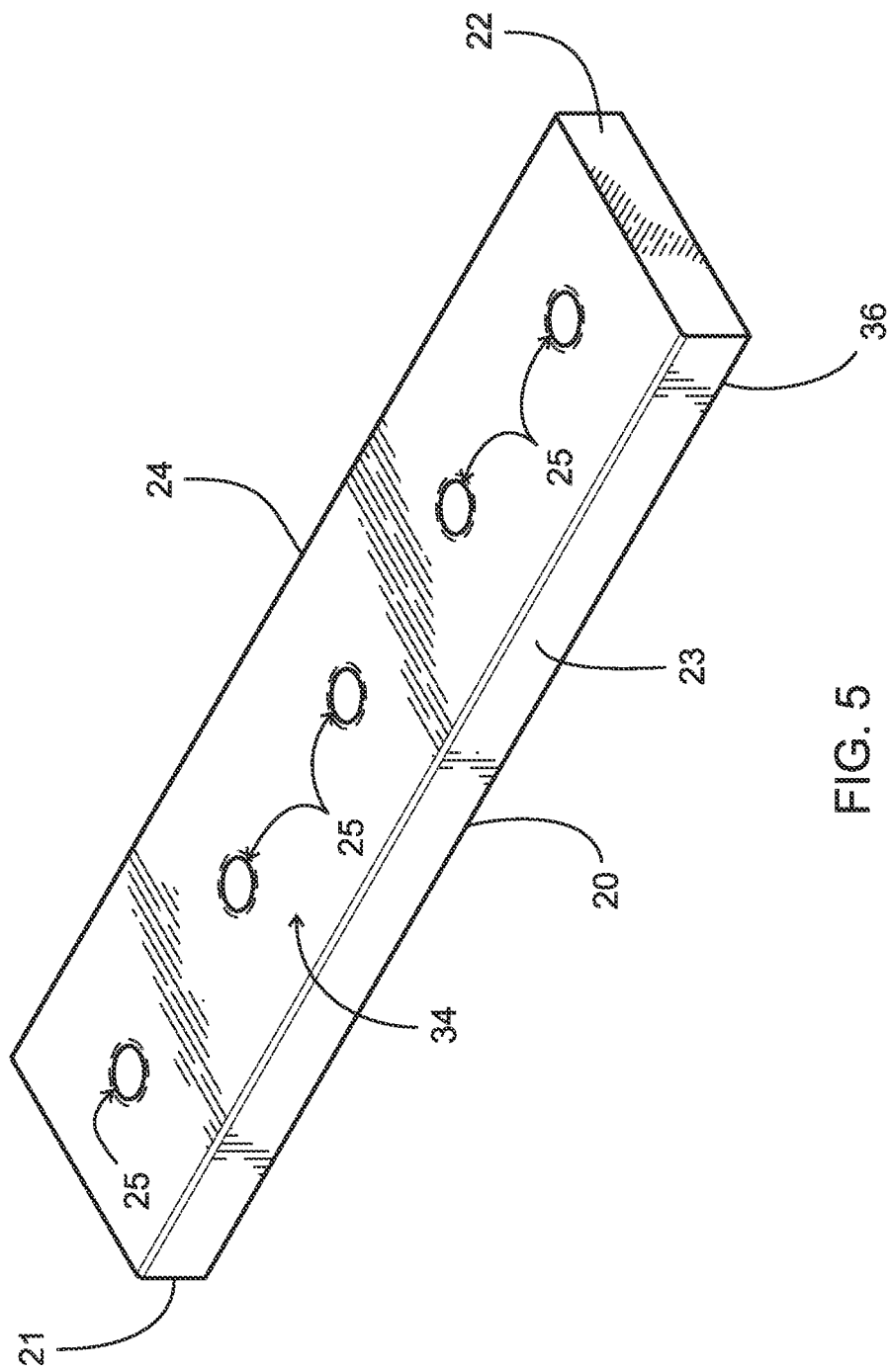
FIG. 5 is a partial perspective view of a preferred embodiment of the apparatus of the present invention showing an insert.
Figure 6:
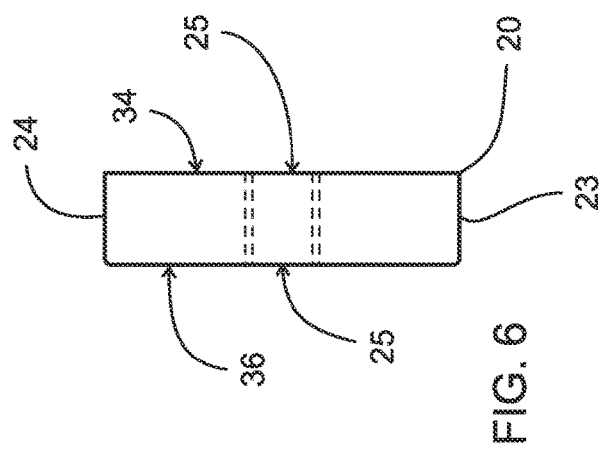
FIG. 6 is a partial end view of a preferred embodiment of the apparatus of the present invention showing an insert.
Figure 7:
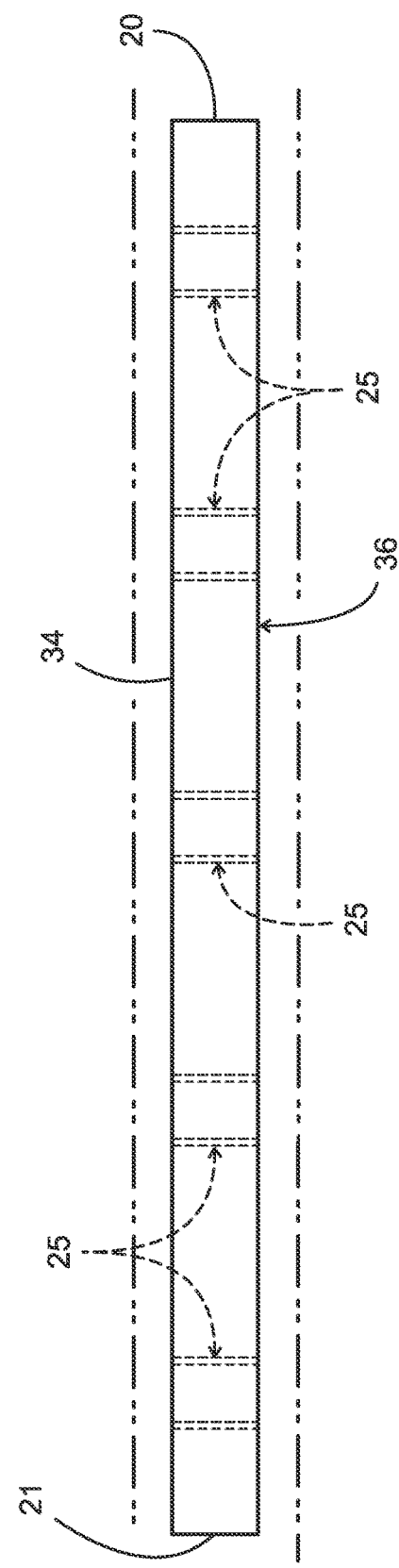
FIG. 7 is a partial side view of a preferred embodiment of the apparatus of the present invention showing an insert.
Figure 8:
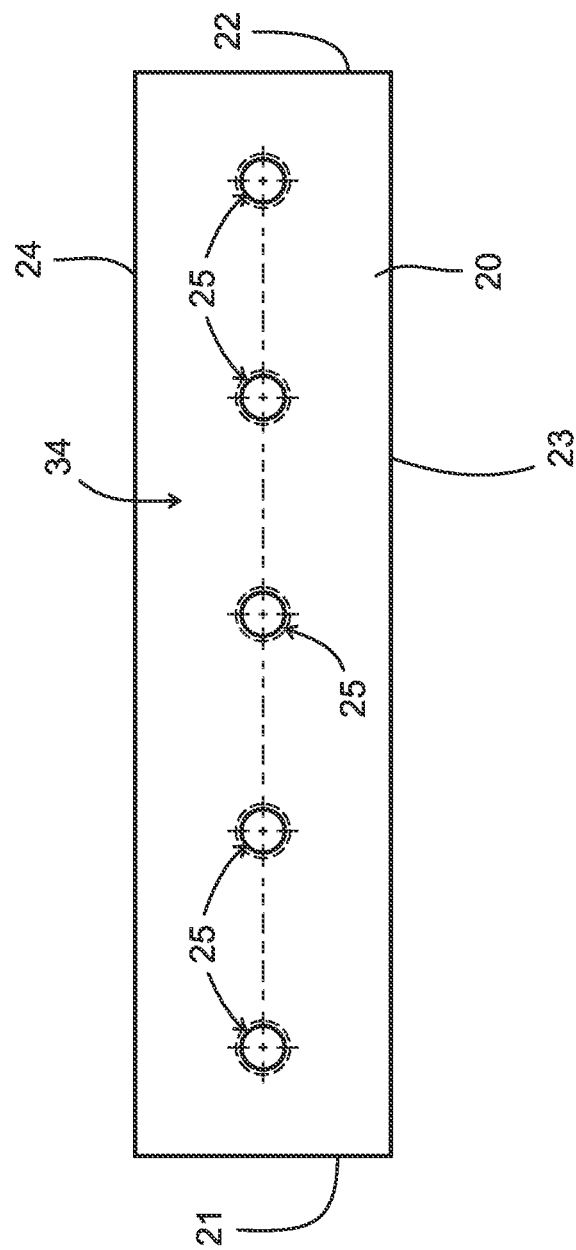
FIG. 8 is a partial top view of a preferred embodiment of the apparatus of the present invention showing an insert.
Figure 9:
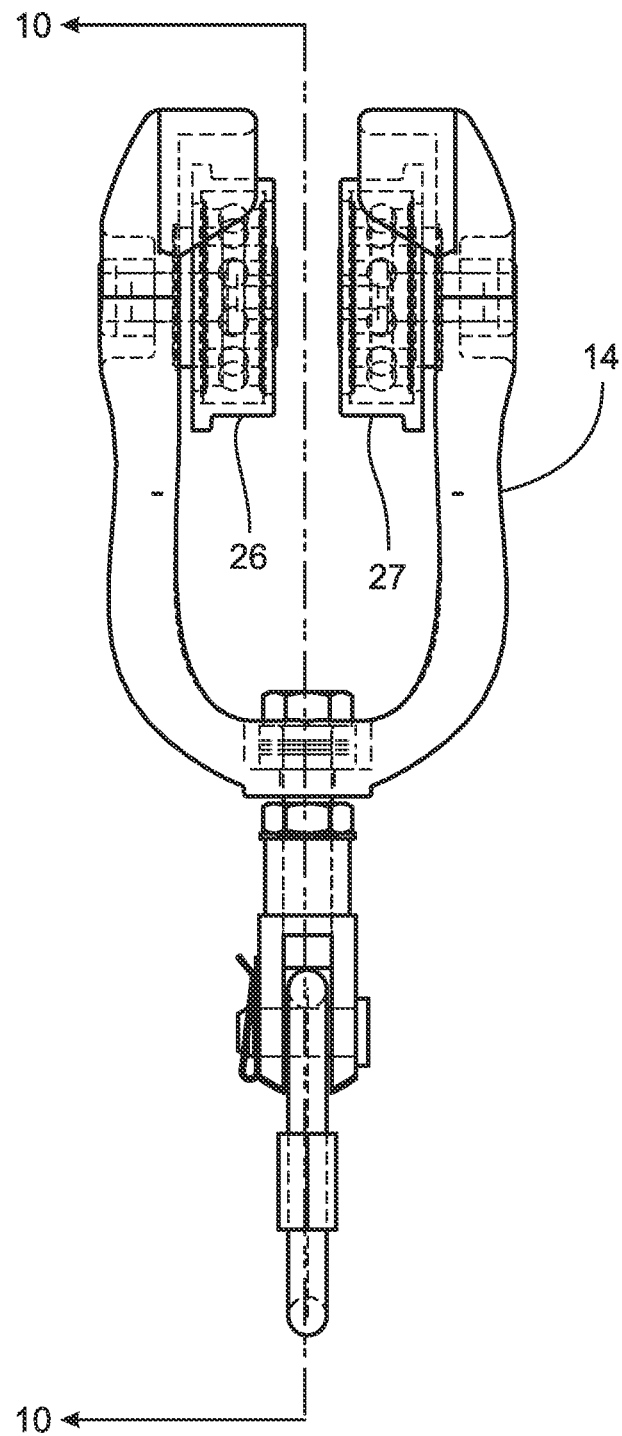
FIG. 9 is a partial end elevation view of a preferred embodiment of the apparatus of the present invention showing a trolley.
Figure 10:
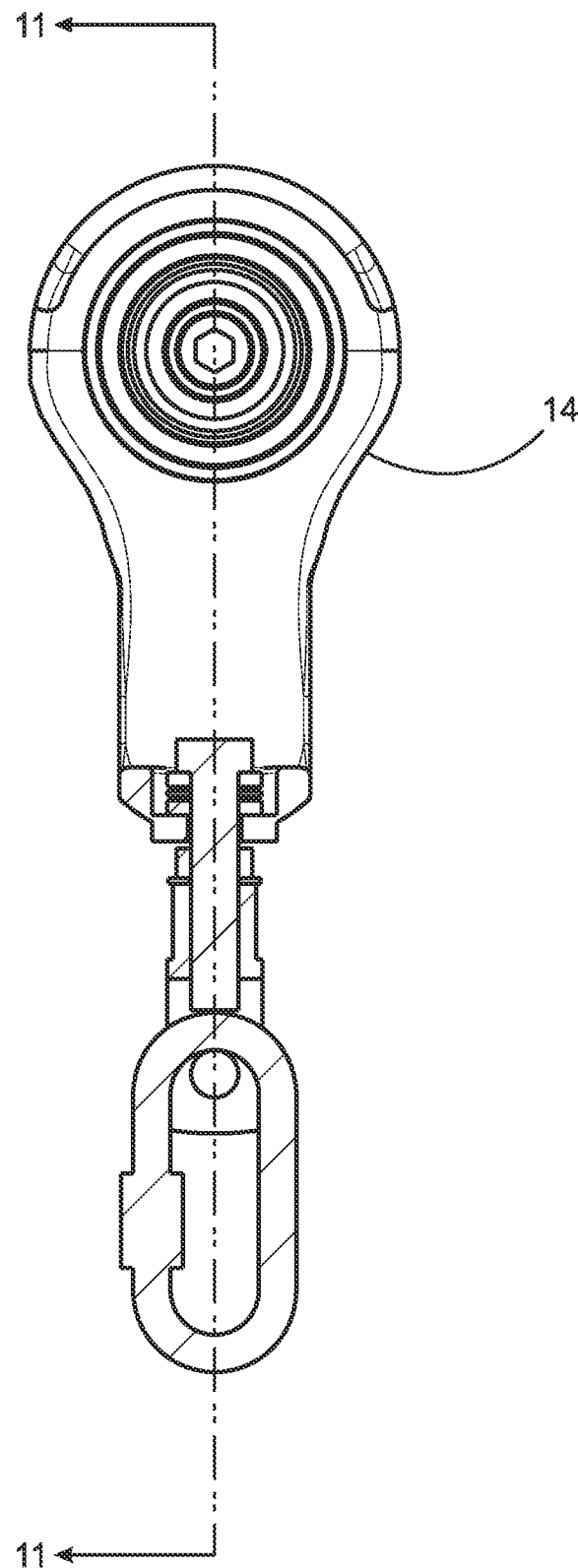
FIG. 10 is a partial side sectional view of a preferred embodiment of the apparatus of the present invention showing a trolley taken along lines 10-10 of FIG. 9.
Figure 11:
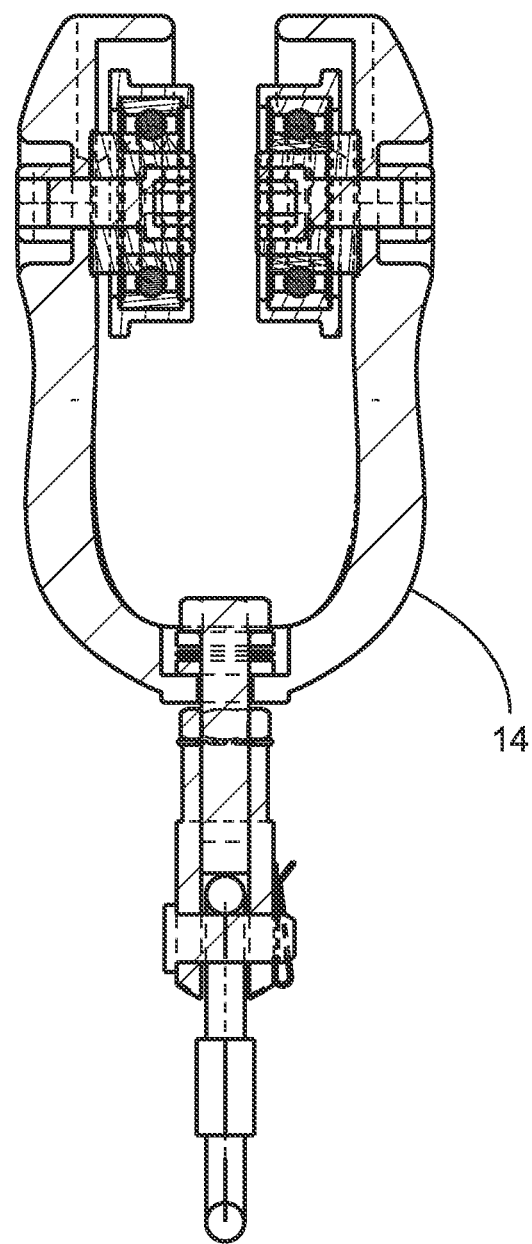
FIG. 11 is a partial sectional view of a preferred embodiment of the apparatus of the present invention showing a trolley taken along lines 11-11 of FIG. 10.
Figure 14:
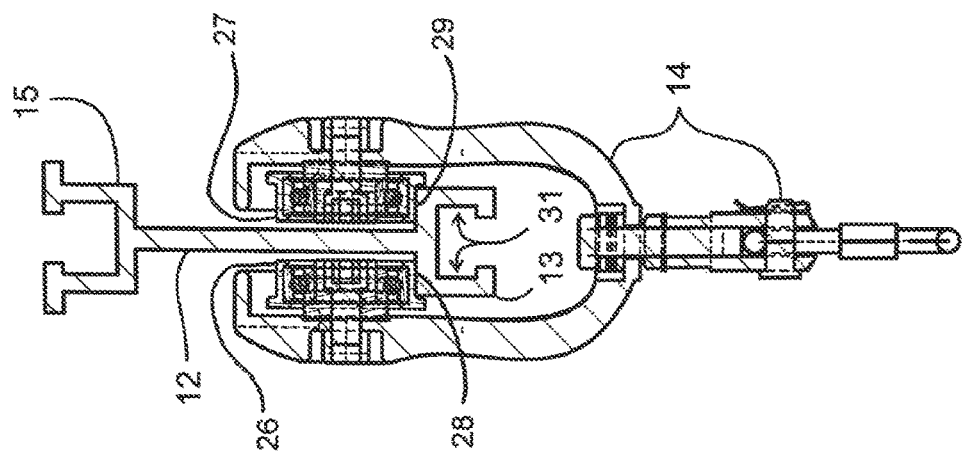
FIG. 14 is a sectional end view of a preferred embodiment of the apparatus of the present invention showing a rail and a trolley taken along lines 14-14 of FIG. 13.
Figure 13:
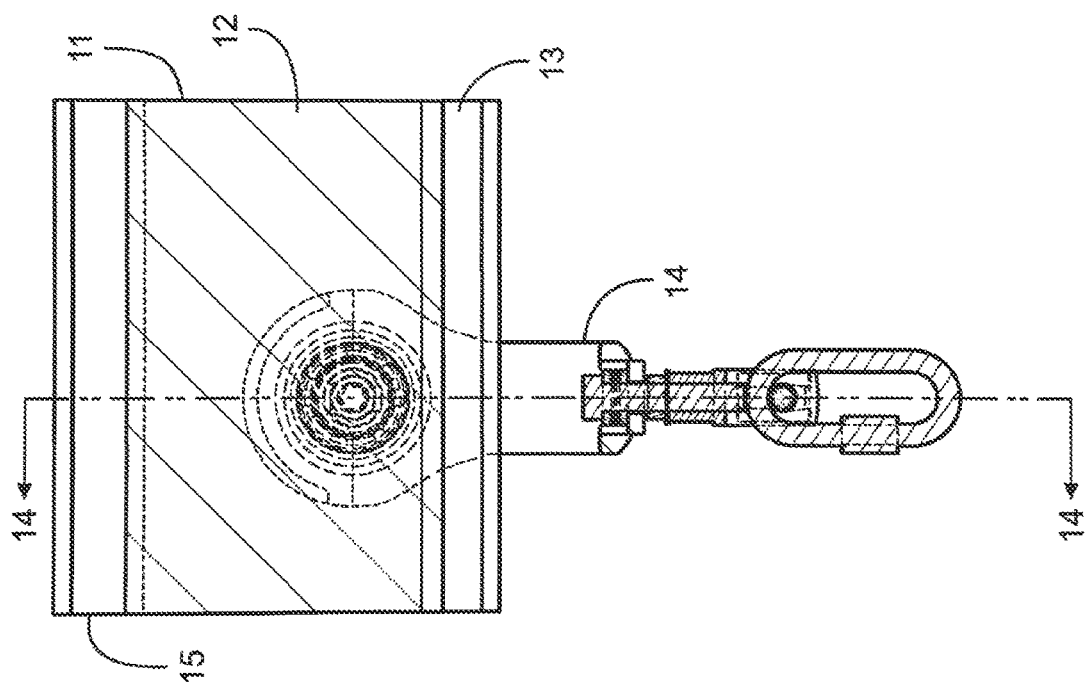
FIG. 13 is a sectional side view of a preferred embodiment of the apparatus of the present invention showing a rail and a trolley.
Figure 12:
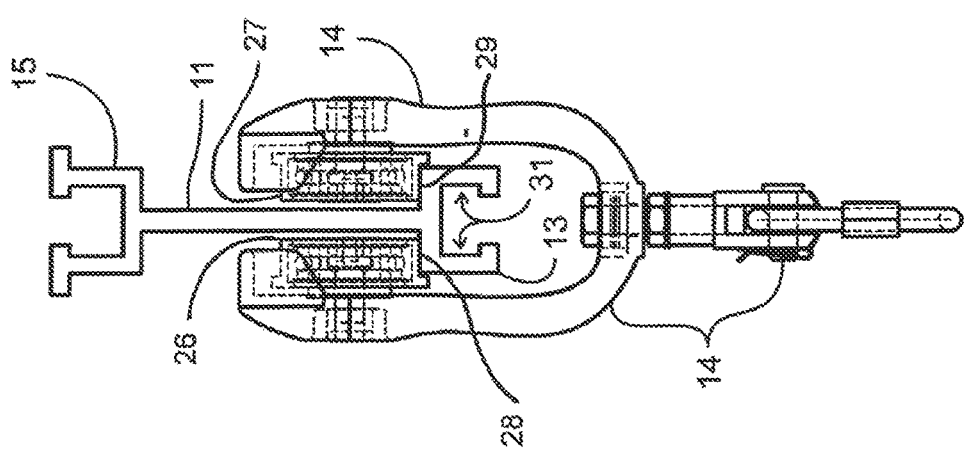
FIG. 12 is a sectional end view of a preferred embodiment of the apparatus of the present invention showing a rail and a trolley.
Figure 15:
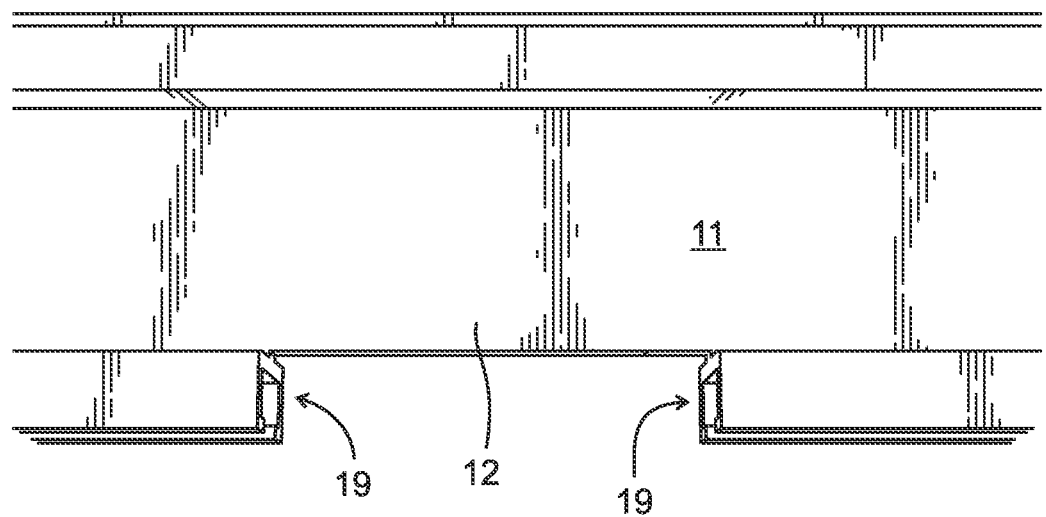
FIG. 15 is a partial perspective view of a preferred embodiment of the apparatus of the present invention showing a rail.
Figure 16:
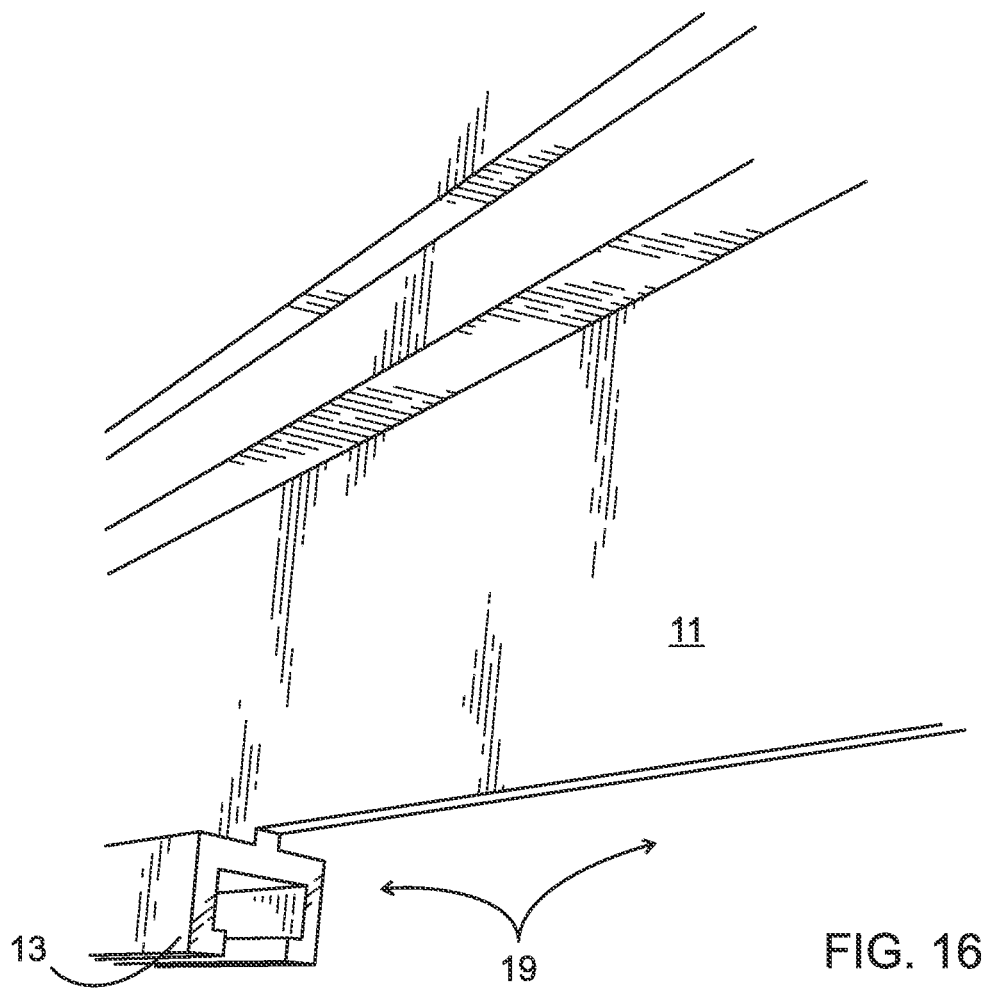
FIG. 16 is a partial perspective view of a preferred embodiment of the apparatus of the present invention showing a rail.
Figure 17:
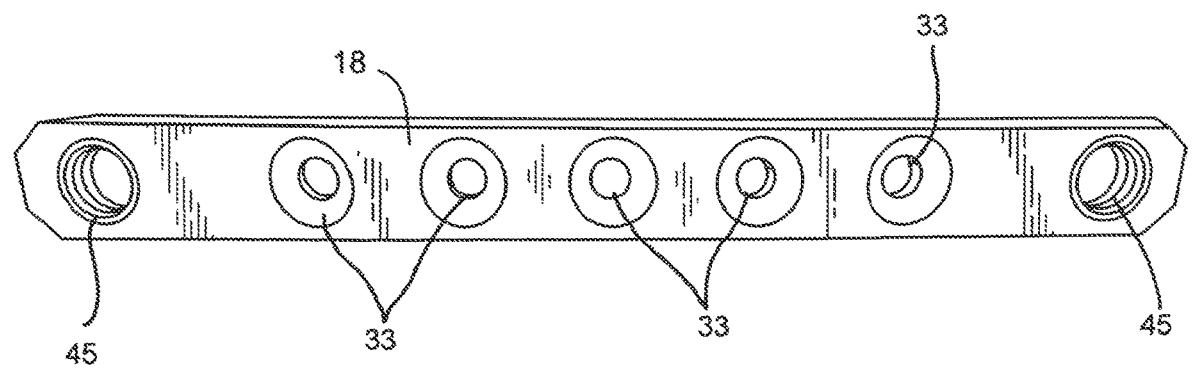
FIG. 17 is a top perspective view of a preferred embodiment of the apparatus of the present invention showing a tap strip.
Figure 18:
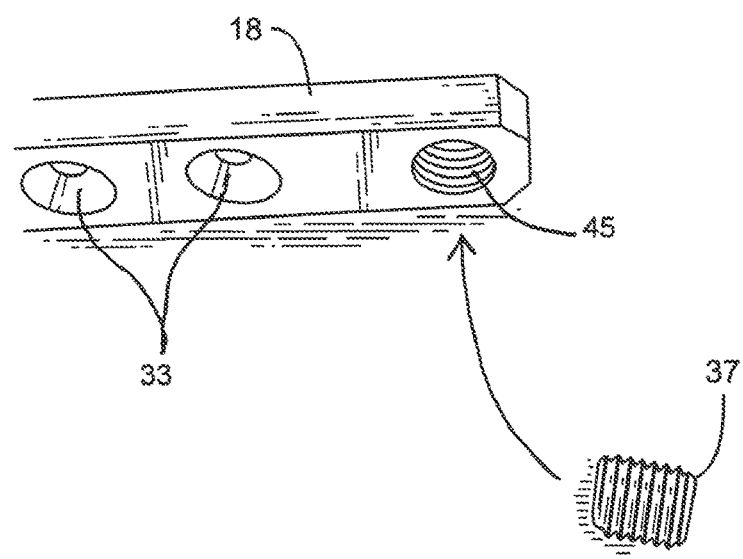
FIG. 18 is a partial perspective view of a preferred embodiment of the apparatus of the present invention showing a tap strip.
Figure 19:
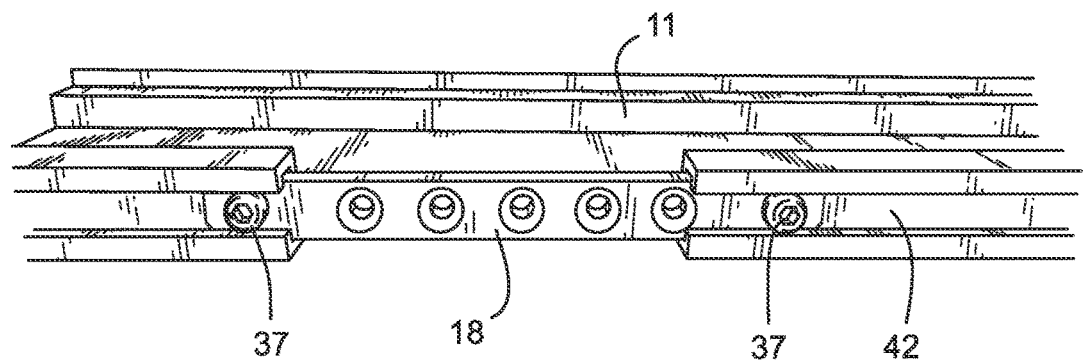
FIG. 19 is a partial perspective view of a preferred embodiment of the apparatus of the present invention showing a rail and a tap strip.

Insert 20 as shown in FIG. 5, for example, preferably has end portions 21, 22 and sides 23, 24. Insert 20 has upper surface 34 that is preferably a wear surface to be engaged by trolley 14 wheels 26, 27. Insert 20 has lower surface 36 that preferably can abut tap strip 18. Insert 20 can be any suitable length required for the area of wear to protect. Insert 20 can preferably be about five (5) inches (12.7 cm) long as an example. Tap strip 18 can be a length such that it preferably extends into longitudinally extending recess or void space 31 of rail 11 at rail lower end portion 13. Tap strip 18 can be any suitable length to support insert 20.

In FIGS. 1-3, 15-16 and 19-21, rail 11 lower section 13 preferably has a generally U-shaped/inverted U-shape. Lower section 13 preferably includes lateral or horizontal plates/rail surfaces 28 and 29 (also sometimes referred to herein as wear surfaces 28, 29) as well as flanges or longitudinal or vertical flanges 38, 39. Each flange 38, 39 is preferably connected to a lateral or horizontal member or horizontal shoulder 40, 41 with slot 42 therebetween. Slot 42 preferably enables access to attach one or more fasteners 37 in threaded openings 45 to secure tap strip 18 to rail 11 lower section 13. Each fastener 37 can be a set screw that engages plates 28, 29 at web 12.

Figure 4:
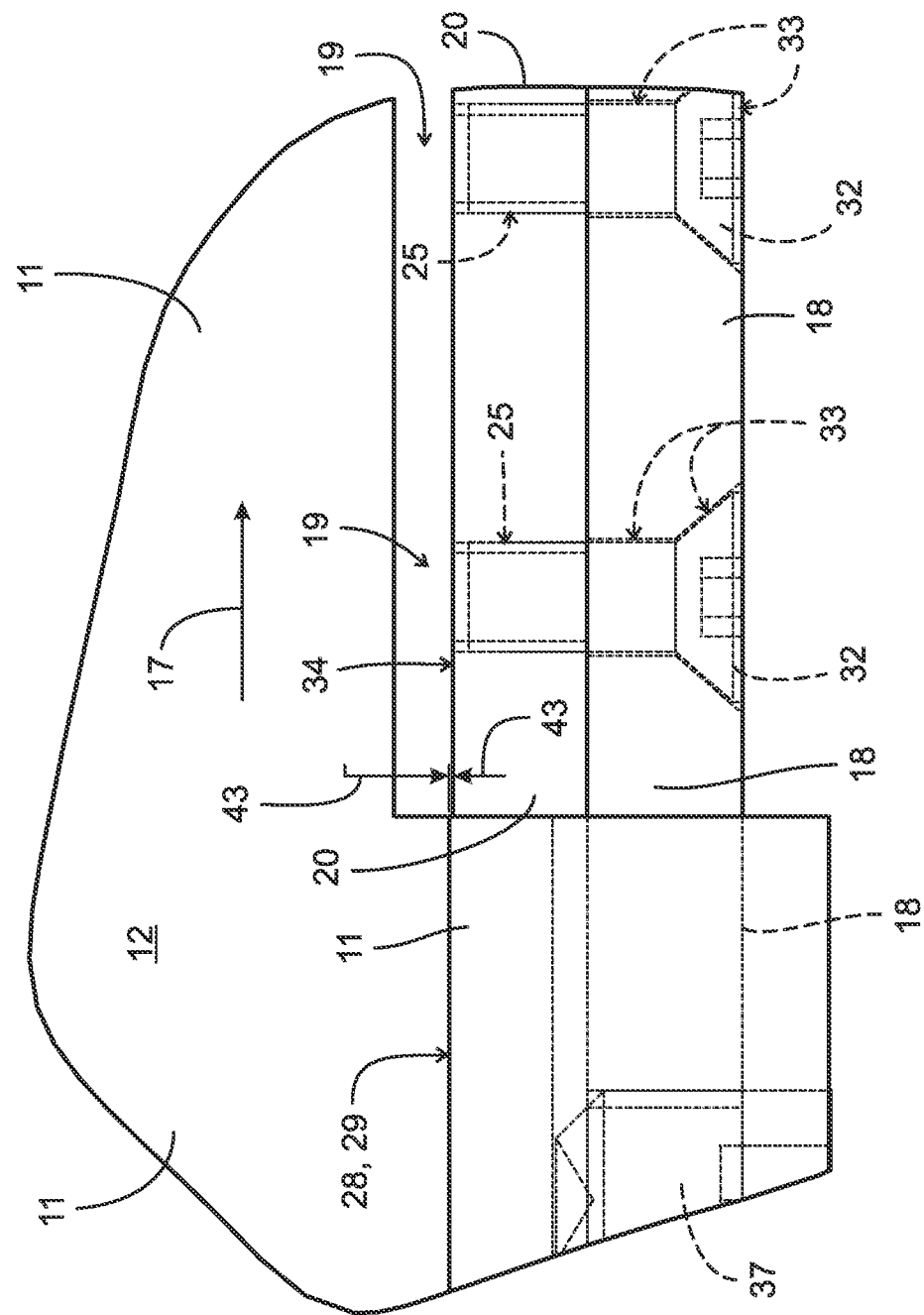
FIG. 4 is a fragmentary elevation side view of a preferred embodiment of the apparatus of the present invention showing an insert, a trolley flow direction and an optional elevation drop from rail to insert.
Figure 22:
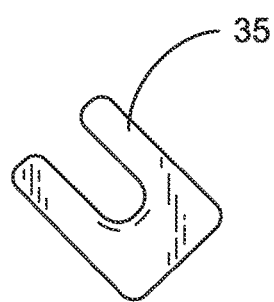
FIG. 22 is a partial perspective view of a preferred embodiment of the apparatus of the present invention showing a shim.
Figure 23:
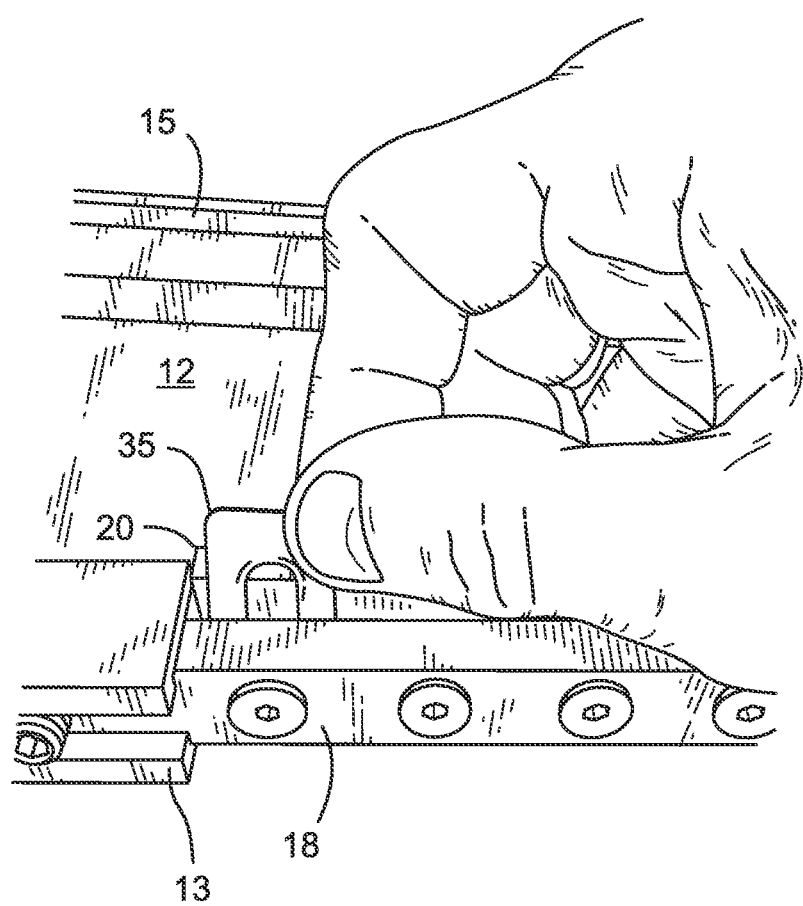
FIG. 23 is a partial perspective view of a preferred embodiment of the apparatus of the present invention showing a rail, a tap strip, an insert and a shim.
Figure 24:
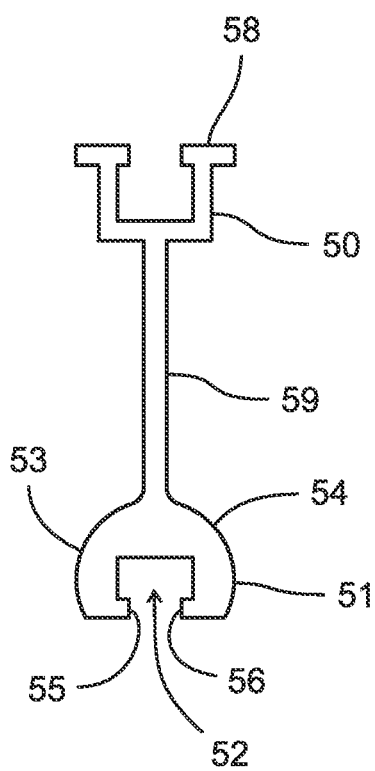
FIG. 24 is a sectional end view of another preferred embodiment of the apparatus of the present invention showing an alternative rail.
Figure 25:
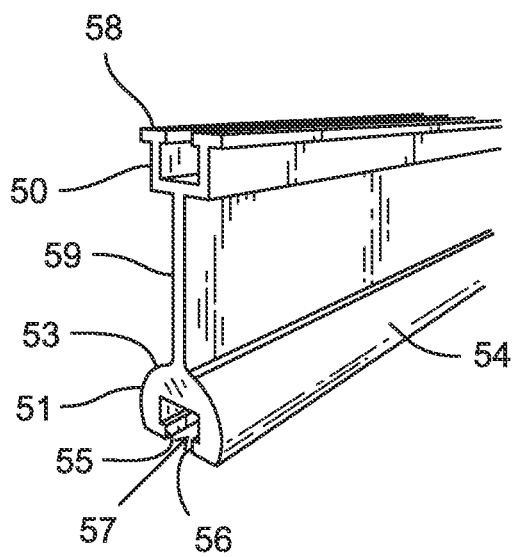
FIG. 25 is a partial perspective view of another preferred embodiment of the apparatus of the present invention showing an alternative rail.
Figure 26:
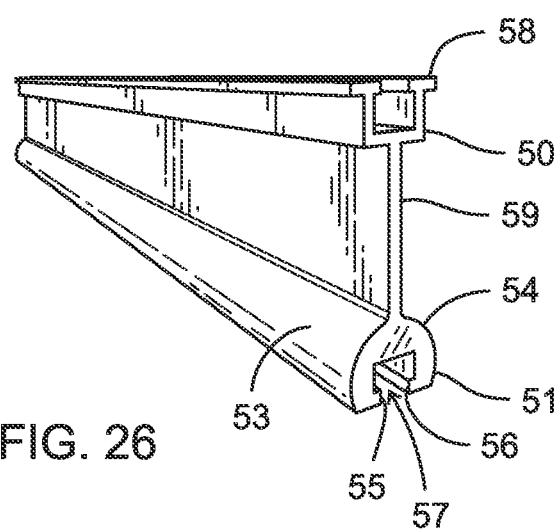
FIG. 26 is a partial perspective view of another preferred embodiment of the apparatus of the present invention showing an alternative rail.

One or more shims 35 can be placed between tap strip 18 and insert 20 as seen in FIGS. 22-23. Shims 35 can be used to set the upper elevation of upper surface 34 of insert at the elevation of wear surfaces 28, 29 or just below as indicated by dimension arrow 43 in FIG. 4. A slight drop in elevation at the interface of rail 11 and insert 20 preferably prevents chipping of the insert 20 which is subjected to more wear because of stop 16 that frequently stops trolley 14 at insert 20. The slight drop as indicated by dimension arrows 43 in FIG. 4 is preferably between about 0.000 and 0.010 inches (0-0.25 mm). A larger drop may cause chipping of the trolley wheel to become excessive. Rail 11 lower end 13 can be provided with a rail no return 44. A rail no return 44 that can be used in the present invention can be one that is both known and commercially available.

Figure 30:
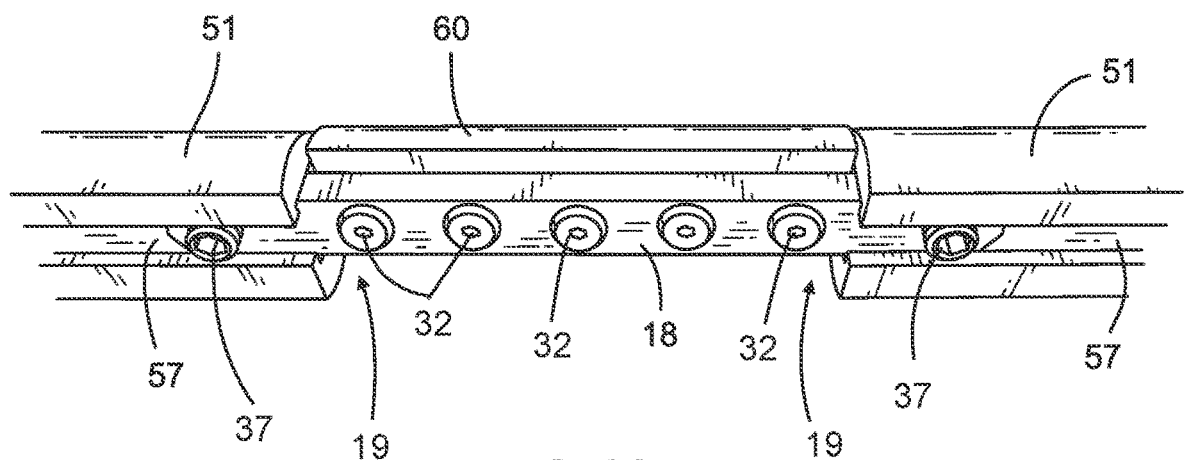
FIG. 30 is a partial perspective view of another preferred embodiment of the apparatus of the present invention showing an alternative rail, tap strip and an alternate insert.
Figure 31:
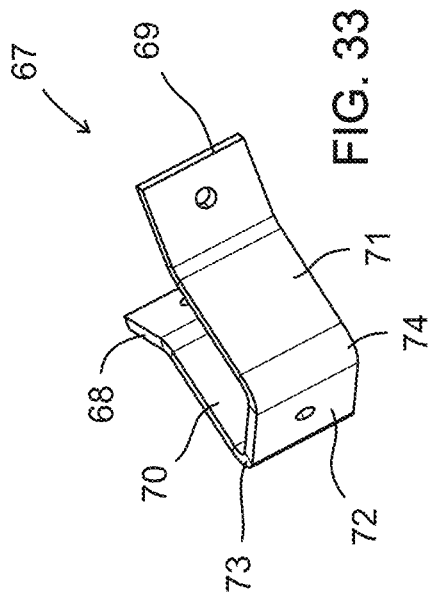
FIG. 31 is a top view of another preferred embodiment of the apparatus of the present invention showing a trolley frame.
Figure 32:
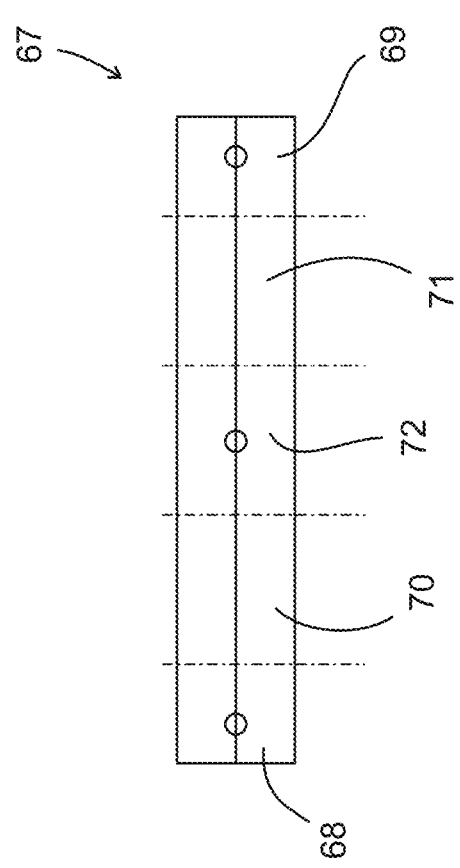
FIG. 32 is a side view of another preferred embodiment of the apparatus of the present invention showing a trolley frame.
Figure 33:
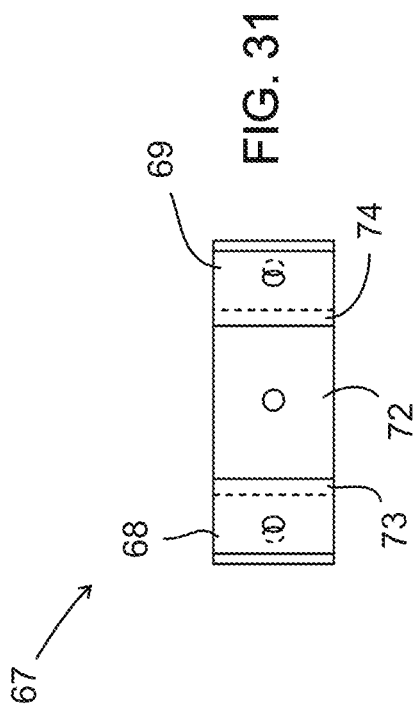
FIG. 33 is a perspective view of another preferred embodiment of the apparatus of the present invention showing a trolley frame.
Figure 34:
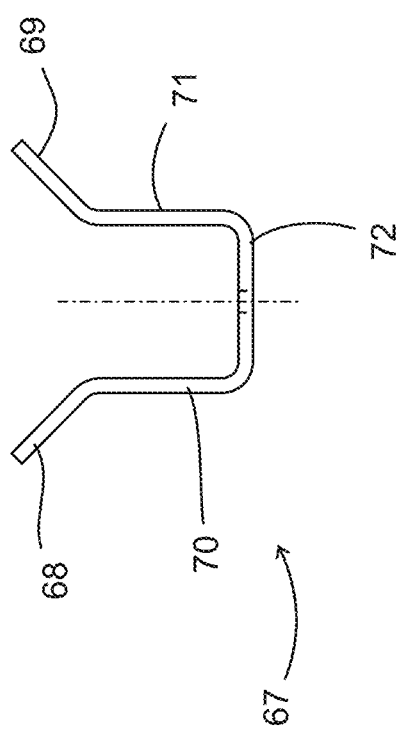
FIG. 34 is a top view of another preferred embodiment of the apparatus of the present invention showing a trolley frame in an expanded position.

FIGS. 24-36 show an alternative preferred embodiment of the apparatus of the present invention having insert 60 that can be fitted to a rail 50 at a gap or cutout section 19 of rail 50, e.g., as seen in FIG. 30. Rail 50 can have a web 59 and a lower end portion 51 that is configured to support trolley 66. Lower section 51 preferably includes curved rail surfaces/flanges 53, 54. Each curved flange 53, 54 is preferably connected to a lateral or horizontal member or horizontal shoulder 55, 56 with slot 52 therebetween. Slot 52 preferably enables access to attach one or more fasteners 37 to secure tap strip 18 at threaded openings 45 to rail 50 lower section 51 as seen in FIG. 30. Each fastener 37 can be a set screw that engages curved flanges 53, 54. Rail 50 preferably has an upper end portion 58 that is configured to support a stop assembly 16.

Figure 36:
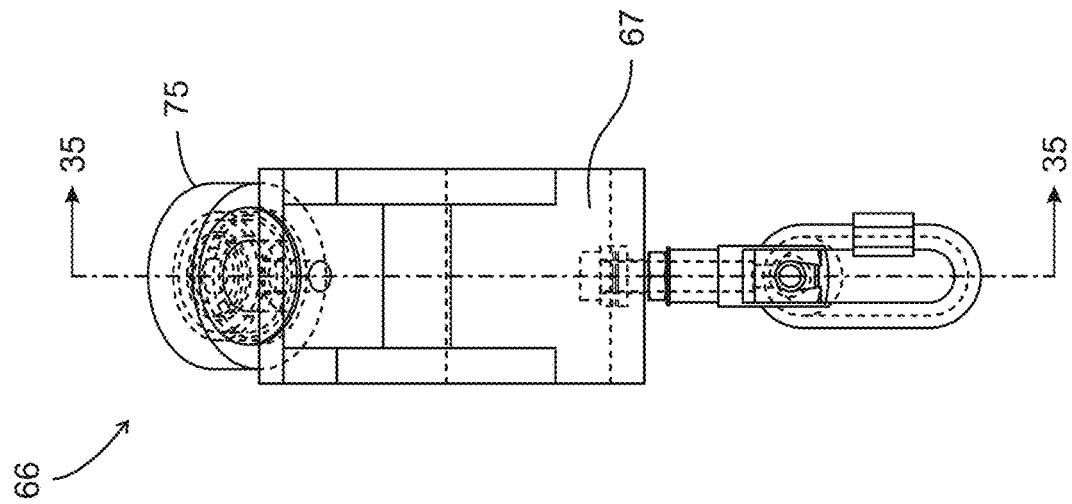
FIG. 36 is a side view of another preferred embodiment of the apparatus of the present invention showing a trolley and frame.
Figure 35:
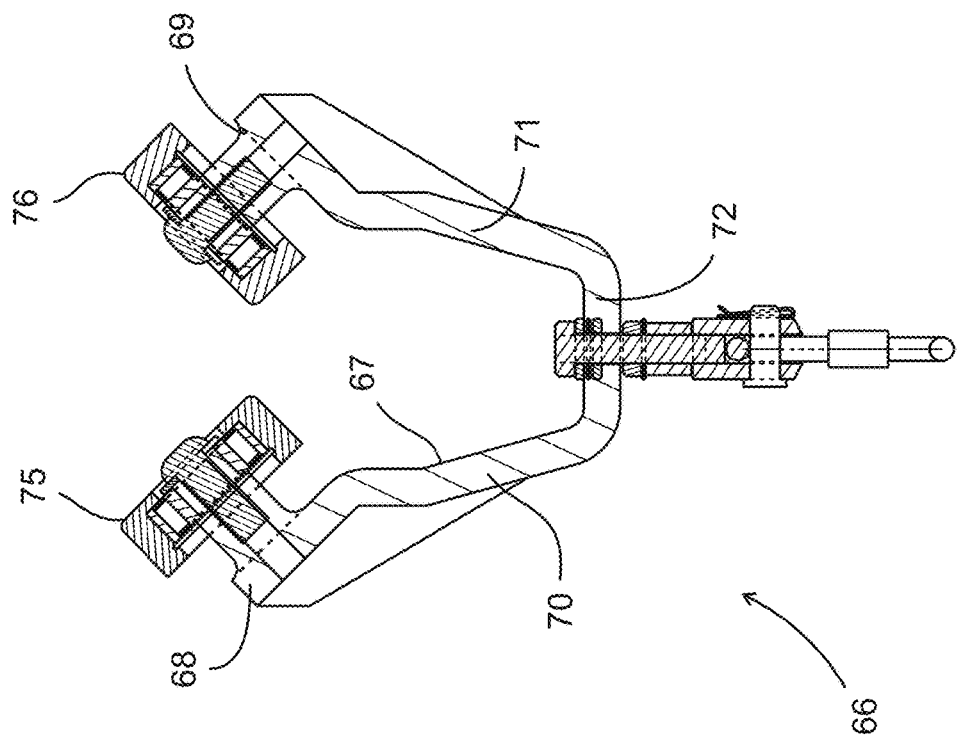
FIG. 35 is a sectional view of another preferred embodiment of the apparatus of the present invention showing a trolley and frame taken along lines 35-35 of FIG. 36.

Trolley 66 preferably includes frame 67 and wheels or bearings 75, 76 as seen in FIGS. 35-36. Frame 67 preferably has angled flanges 68, 69, longitudinal or vertical flanges 70, 71, lateral or horizontal members 73, 74, and lateral/horizontal member 72 (see FIGS. 31-34). Wheels or bearings 75, 76 are preferably connected to angled flanges 68, 69 on frame 67. Trolley 66 can have wheels or bearings 75, 76 that preferably ride upon curved rail surfaces 53, 54 at lower end portion 51 of rail 50. A trolley 66 and stop assembly 16 that can be used in one or more preferred embodiments of the present invention can be ones that are both known and commercially available.

Figure 27:
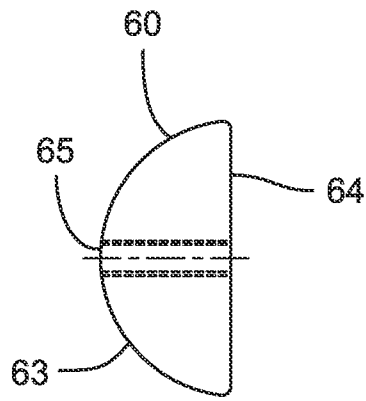
FIG. 27 is a sectional view of another preferred embodiment of the apparatus of the present invention showing an alternative insert.
Figure 28:
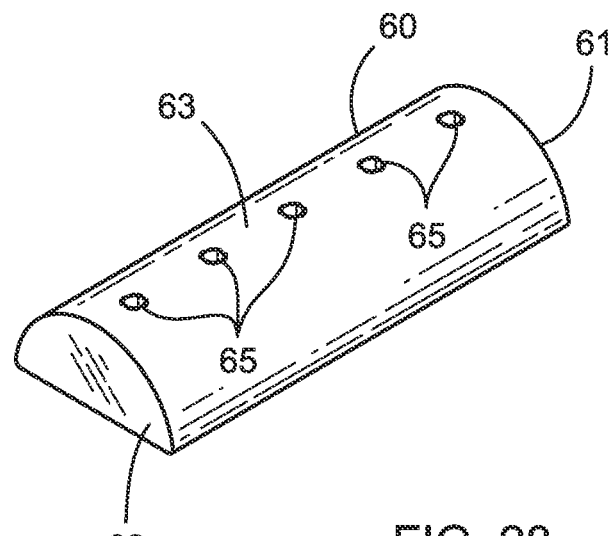
FIG. 28 is a perspective view of another preferred embodiment of the apparatus of the present invention showing an alternative insert.
Figure 29:
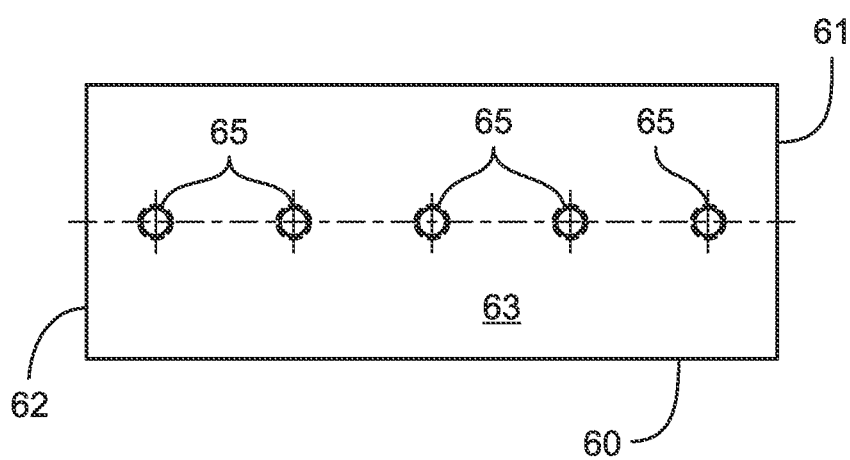
FIG. 29 is a top view of another preferred embodiment of the apparatus of the present invention showing an alternative insert.

Insert 60, e.g., as shown in FIGS. 27-28, has end portions 61, 62, top curved portion/surface 63 and a bottom 64. Insert 60 can have upper surface 63 that is preferably a wear surface to be engaged by trolley 66 wheels 75, 76. Insert 60 preferably has lower surface 64 that preferably abuts tap strip 18. Tap strip 18 preferably has tap strip openings 33, wherein fasteners 32 preferably extend through a tap strip opening 33 and threadably engages an internally threaded opening 65 of insert 60 (see FIG. 30). Insert 60 can be any suitable length required for the area of wear to protect. Insert 60 can preferably be about five (5) inches (12.7 cm) long, as an example. The base material and plating of insert 60 can preferably be same material and plating as insert 20.

At cutout section 19, tap strip 18 preferably extends into longitudinally extending recess or void space 57 in lower end portion 51 of rail 50 below web 59 (see FIG. 30). Insert 60 is preferably placed on top of tap strip 18 at cutout section 19. Fasteners 32 preferably connect insert 60 to tap strip 18.

One or more shims 35 can be placed between tap strip 18 and insert 60 and preferably used to set the upper elevation of upper surface 63 of insert 60 at the elevation of wear surfaces 53, 54 or just below at a slight drop. The slight drop is preferably between about 0.000 and 0.010 inches (0-0.25 mm).

The following is a list of parts and materials suitable for use in the present invention:

| PARTS LIST: | |
|---|---|
| PART NUMBER | DESCRIPTION |
| 10 | rail and trolley system |
| 11 | rail |
| 12 | web |
| 13 | lower end portion/lower section |
| 14 | trolley |
| 15 | upper end portion |
| 16 | stop assembly |
| 17 | arrow |
| 18 | tap strip |
| 19 | cut out/gap/cutout section |
| 20 | insert |
| 21 | end portion |
| 22 | end portion |
| 23 | side |
| 24 | side |
| 25 | internally threaded opening |
| 26 | wheel/bearing |
| 27 | wheel/bearing |
| 28 | rail surface/lateral or horizontal surface/lateral or horizontal plate/wear surface |
| 29 | rail surface/lateral or horizontal surface/lateral or horizontal plate/wear surface |
| 30 | trolley detector |
| 31 | void space/longitudinally extending recess |
| 32 | fastener |
| 33 | tap strip opening |
| 34 | upper surface/wear surface |
| 35 | shim |
| 36 | lower surface |
| 37 | fastener/set screw |
| 38 | flange/vertical flange/longitudinal flange |
| 39 | flange/vertical flange/longitudinal flange |
| 40 | lateral or horizontal shoulder/member |
| 41 | lateral or horizontal shoulder/member |
| 42 | slot/longitudinally extending slot |
| 43 | dimension arrow |
| 44 | rail no return |
| 45 | opening/threaded opening |
| 50 | rail |
| 51 | lower end portion/lower section |
| 52 | void space/longitudinal extending recess |
| 53 | curved flange/curved rail surface |
| 54 | curved flange/curved rail surface |
| 55 | lateral or horizontal shoulder/member |
| 56 | lateral or horizontal shoulder/member |
| 57 | slot/longitudinally extending slot |
| 58 | upper end portion |
| 59 | web |
| 60 | insert |
| 61 | end portion |
| 62 | end portion |
| 63 | curved top portion/upper surface/wear surface |
| 64 | bottom |
| 65 | internally threaded opening |
| 66 | trolley |
| 67 | trolley frame |
| 68 | flange/angled flange |
| 69 | flange/angled flange |
| 70 | vertical flange/longitudinal flange |
| 71 | vertical flange/longitudinal flange |
| 72 | lateral or horizontal member |
| 73 | flange/angled flange |
| 74 | flange/angled flange |
| 75 | wheel/bearing |
| 76 | wheel/bearing |

The foregoing embodiments are presented by way of example only; the scope of the present invention is to be limited only by the following claims.

The invention claimed is:

1. An overhead rail and trolley apparatus, comprising:
   a) an overhead rail having one or more tracks;
   b) a wheeled trolley having a wheel or wheels that travel upon said tracks;
   c) a stop unit on the rail that is positioned to selectively halt the trolley;
   d) a cutout section on the rail;
   e) an insert that is attached to the rail at the cutout;
   f) wherein the trolley wheels engage an upper surface of the insert when the trolley is halted by the stop unit;
   g) a plating on the insert that increases hardness of the insert upper surface;
   h) wherein the rail has a web and a lower end portion connected to the web and that includes a longitudinally extending slot having opposed flanges that extend below the web; and
   i) further comprising a tap strip attached to the rail and occupying the longitudinally extending slot, wherein the insert is attached to the tap strip.

2. The apparatus of claim 1 wherein the plating is chrome plating.

3. The apparatus of claim 1 wherein the plating is Melonite.

4. The apparatus of claim 1 wherein the insert is heat treated steel.

5. The apparatus of claim 4 wherein the steel is 410 stainless steel.

6. The apparatus of claim 1 wherein the rail has a lower section that is an inverted U shape.

7. The apparatus of claim 1 wherein the lower end portion of the rail has one or more shoulders below the web that are below the tap strip.

8. The apparatus of claim 1 wherein said lower end portion includes said flanges and one or more shoulders that are below said flanges.

9. An overhead rail and trolley apparatus, comprising:
   a) an overhead rail having one or more tracks;
   b) a wheeled trolley having a wheel or wheels that travel upon said tracks;
   c) a stop unit on the rail that is positioned to selectively halt the trolley;
   d) a cutout section on the rail;
   e) an insert that is attached to the rail with a tap strip that is attached to the rail lower end portion;
   f) wherein the trolley wheels engage the upper surface of the insert when the trolley is halted by the stop unit; and
   g) a plating on the insert that increases hardness of the insert upper surface.

10. The apparatus of claim 9 wherein the plating is Melonite.

11. The apparatus of claim 9 wherein the insert upper surface is curved.

12. The apparatus of claim 9 wherein the insert upper surface is relatively flat.

\* \* \* \* \*